United States Patent Office 3,211,958
Patented Oct. 12, 1965

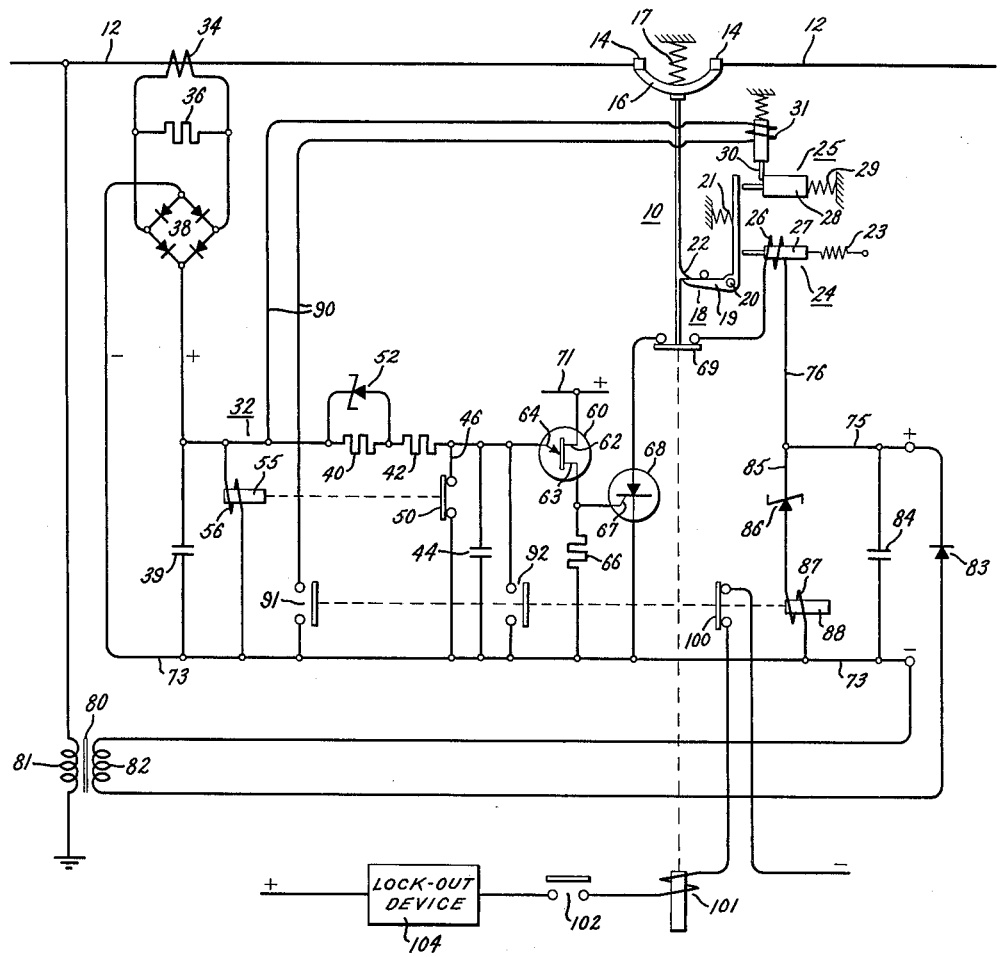

3,211,958
TRIPPING ARRANGEMENT FOR AN ELECTRIC CIRCUIT BREAKER
Richard H. Miller, Havertown, and August L. Streater, Broomall, Pa., assignors to General Electric Company, a corporation of New York
Filed Mar. 8, 1962, Ser. No. 178,477
7 Claims. (Cl. 317—60)

This invention relates to a tripping arrangement for an electric circuit breaker, and, more particularly, relates to a tripping arrangement that is capable of effecting tripping even though normal control voltage for the tripping arrangement is not available at the time tripping is required.

In the tripping arrangement of the present invention, tripping of the circuit breaker is effected in response to an overcurrent condition in a power line, and the energy for tripping is normally derived from an energy source that is dependent upon power line voltage. A problem encountered with this type of tripping arrangement is that the power line voltage may be lost or reduced during certain periods, and this tends to result in unavailability of the energy needed for tripping, as during an overcurrent condition occurring during this reduced voltage period.

One approach to this problem has been to use a capacitor trip arrangement in which the energy for tripping is stored in a capacitor charged from line voltage. During periods of normal voltage as well as during short periods of reduced voltage, this stored energy is available for tripping. But a serious limitation of the usual capacitor trip arrangement is that a prolonged loss of voltage on a power line, as might occur from the opening of a back-up circuit breaker, renders the tripping arrangement inoperative during the critical period immediately following reenergization of the power line, assuming line voltage is not then present. This inoperativeness results from the fact that the capacitor loses its charge through leakage during the prolonged period when the main power line is deenergized, and, as a result, tripping power is not available immediately after reenergization of the main power line, particularly if line voltage is not then present. Primarily for this reason, capacitor trip arrangements have been avoided where there is a likelihood that the power line (which is the capacitor-charging source) will be deenergized for a prolonged period.

An object of our invention is to provide an improved circuit breaker tripping arrangement that is capable of effecting tripping in response to an overcurrent even though normal control voltage is not then available and has not been available for a prolonged period just prior to the instant at which tripping is required.

In carrying out our invention in one form, we provide a tripping arrangement that comprises two trip devices that can be independently operated to trip the circuit breaker. One of these trip devices is a normal trip device, and the other is a standby trip device that can operate to trip the breaker with a much smaller energy input than that required for the normal trip device. The tripping arrangement further comprises a trip circuit for supplying operating energy to the normal trip device in response to overcurrents exceeding a predetermined value. This trip circuit includes a control power circuit having terminals across which a control voltage having a predetermined minimum value must be present to cause the trip circuit to effect operation of the normal trip device in response to said overcurrents. Monitoring means sensitive to the voltage across these terminals is provided for normally maintaining the standby trip device insensitive to said overcurrents. This monitoring means is responsive to a drop in said control voltage to a predetermined level to render the standby tripping device responsive to said overcurrents and to render the normal tripping device insensitive to said overcurrents.

In a preferred embodiment of our invention, the monitoring means sensitive to the control voltage across the terminals of the control power circuit is a sensitive relay which is intended to drop out in response to a fall in this control voltage to a predetermined level. It is important that this relay drop out at a rather precise voltage in order to assure that the standby trip device will be made available for tripping whenever insufficient energy is available to produce operation of the normal trip device. Most sensitive relays are characterized by a rather unpredictable drop-out voltage that can vary over a wide range from about 30% of pickup voltage down to virtually zero volts.

Accordingly, another object of our invention is to render the drop-out performance of such a relay more precise and predictable so that such drop-out can be relied upon to insert the standby trip device at the proper point.

In carrying out this aspect of our invention in one form, we connect the coil of the sensitive relay in a monitoring circuit across the terminals of the control power circuit. The control power circuit is a D.C. circuit. In the monitoring circuit and in series with the relay coil, we connect a Zener diode that is poled to block the flow of current through said coil when the control voltage is below the breakdown voltage of the Zener diode. The breakdown voltage of the Zener diode exceeds the minimum value of control voltage that will produce operation of the normal trip device.

For a better understanding of our invention, reference may be had to the following specification taken in conjunction with the accompanying drawing, wherein: the single figure is a schematic showing of a tripping arrangement embodying one form of our invention.

Referring now to the drawing, there is shown a circuit breaker 10 for controlling the flow of current through a power line 12, which may be one phase of a polyphase alternating current power system. The circuit breaker 10 comprises a set of stationary contacts 14 and a movable bridging contact 16 biased in a direction away from the stationary contacts by a suitable compression spring 17. The circuit breaker 10 is normally maintained in its closed position of the drawing by means of a suitable trip latch 18 that can be released in a manner soon to be described to permit the spring 17 to separate the contacts 16 and 14 and thereby interrupt the flow of power through the power line 12.

The trip latch 18, which is schematically shown in the drawing, comprises a pivoted latching lever 19 which is biased in a clockwise direction about its stationary pivot 20 by means of a suitable spring 21. The latching lever 19 cooperates at one of its free ends with a detent 22 on the circuit breaker operating rod to hold the contact 16 closed so long as this free end is beneath the detent 22, as shown in the drawing. When the latching lever 19 is driven in a counterclockwise direction about its pivot 20, the detent is no longer restrained and the spring 17 is free to force the operating rod and contacts 16 in a downward opening direction.

For driving the latching lever 19 in a counterclockwise tripping direction, two separate trip devices are provided. One of these trip devices is designated 24 and is referred to hereinafter as the normal trip device. The other trip device is designated 25 and is referred to hereinafter as the stand-by trip device or the impact trip device. The normal trip device comprises a solenoid having an operating coil 26 and an armature 27, which is driven to the left against a reset spring 23 to effect tripping when the coil 26 is energized. The impact trip device comprises an armature 28 which is biased toward the left by means of a compression spring 29. The armature 28 is normally restrained in its inactive position of the drawing by means of a secondary latch 30 which is controlled by the solenoid 31. When the solenoid 31 is operated, it releases the secondary latch 30 and permits the spring 29 to drive the armature 28 of the standby trip device to the left to effect tripping of the circuit breaker.

The stand-by trip device 25 can be operated to trip the circuit breaker by a much smaller amount of input energy than the amount of input energy required for operating the normal trip device 24. For the stand-by trip device, the input energy is the energy supplied to the winding of solenoid 31, whereas for the normal trip device, the input energy is the energy supplied to the winding 26 of solenoid 24. The normal trip device is ordinarily relied upon for tripping the circuit breaker in response to predetermined electrical conditions in the power line 12, but under certain emergency conditions (soon to be described) the stand-by trip device is relied upon for such tripping. For reasons which need not be explained in the present application, it is preferable to rely upon the normal trip device for tripping whenever sufficient energy is available to effect operation of the normal tripping device in its intended manner.

The above described tripping operations are controlled by a tripping circuit 32, which is designated to trip circuit breaker 10 open in response to overcurrents in the power line 12 above a predetermined pick-up value. Such tripping will occur with a time delay that varies in duration inversely with respect to the magnitude of the overcurrent. For sensing the magnitude of the current flowing in power line 12, a current transformer secondary winding 34 magnetically coupled to the power line 12 is provided. Connected across the terminals of the current transformer secondary winding 34 is a suitable resistor 36, across which is developed an alternating voltage that is proportional to the current flowing through the current transformer winding 34 and hence through the power line 12.

The voltage developed across the resistor 36 is rectified by a conventional rectifying bridge 38 connected across the resistor 36, and the full-wave rectified output from this bridge is smoothed by a smoothing capacitor 39 connected across the output terminals of the rectifying bridge 38. Accordingly, a relatively smooth unidirectional voltage, hereinafter referred to as the signal voltage, is developed across the terminals of capacitor 39. This signal voltage is approximately proportional to the magnitude of the current flowing through the power line 12.

For developing a voltage that builds up at a rate that varies inversely with respect to the magnitude of the signal voltage once the signal voltage exceeds a predetermined value, a suitable timing circuit connected across the terminals of smoothing capacitor 39 is provided. This timing circuit comprises a plurality of resistors 40 and 42 and a timing capacitor 44 all connected in series circuit relationship when the timing circuit is active. Normally the timing circuit is rendered inactive by a low impedance discharge circuit 46 shunting the timing capacitor 44 and preventing a significant charge from being built up across the capacitor 44. The timing circuit is rendered active only when a set of contacts 50, connected in the discharge circuit 46, are opened to interrupt the discharge circuit. This is done in a manner soon to be explained.

The timing circuit is designed so that once it becomes active, the voltage across the timing capacitor 44 builds up to a predetermined critical level (soon to be described) in a time inversely proportional to approximately the square of the overcurrent for low values of overcurrent. For high values of overcurrent, this time is inversely proportional to a lower exponent of the current. This change in timing for different levels of overcurrent is achieved by means of a Zener diode 52 shunting one of the resistors 40. This relationship, which is not a part of our invention, is disclosed in more detail and is claimed in application S.N. 138,476—Dewey, now Patent No. 3,105,920, filed September 15, 1961 and assigned to the assignee of the present invention.

For rendering the timing circuit active when the current in power line 12 exceeds a predetermined value, which is referred to hereinafter as the pickup rating of the circuit breaker, a gating relay 55 having an operating coil 56 connected across the terminals of the smoothing capacitor 39 is provided. This gating relay comprises the aforementioned normally-closed contacts 50 that are connected in the discharge circuit 46 around the timing capacitor 44. When the signal voltage developed across the smoothing capacitor 39 exceeds a predetermined value (corresponding in value to the rated pickup current of the circuit breaker), the coil 56 of the relay becomes sufficiently energized to cause the relay to operate and open its contacts 50. This removes the discharge circuit 46 from around the timing capacitor 44 and thus allows the timing capacitor to begin its timing function, i.e., renders the timing circuit active.

For tripping the circuit breaker 10 when the output voltage from the timing circuit reaches a predetermined value, a level detector 60 in the form of a silicon unijunction transistor is provided. This unijunction transistor 60 is of a conventional form, such as disclosed and claimed in U.S. Patent No. 2,769,926—Lesk, assigned to the assignee of the present invention, and it will therefore be explained only in sufficient detail to provide an understanding of the present invention. Referring now to the unijunction transistor 60, 62 and 63 represent the two bases of the transistor, and 64 represents the emitter of the transistor. The two bases 62 and 63 are connected across a source of voltage comprising a positive bus 71 and a negative bus 73 between which a constant voltage is maintained. The details of this source are unimportant to the present invention and therefore are not shown in the drawing. So long as the voltage between the emitter 64 and the lower base 63 is below a certain critical value, called the peak point emitter voltage, a very high resistance is present between the emitter and the two bases, and therefore no significant amount of current flows in the circuit of emitter 64. However, when the emitter voltage is increased to this critical peak point emitter voltage, the transistor 60 fires, i.e., the resistance between its emitter 64 and base 63 suddenly drops, allowing greatly increased current to flow from the emitter 64 through the base 63. This greatly increased current is derived from the timing capacitor 44, which, in response to firing of the transistor 60, quickly discharges through the circuit including the emitter 64 and the base 63.

Connected in series circuit relationship with the lower base 63 is a resistor 66 across which a voltage is abruptly developed when current flows through the emitter-base circuit upon firing of the unijunction transistor 60. This voltage is applied to the gating electrode 67 of a silicon controlled rectifier 68, which responds by firing to complete a tripping circuit 76 through the trip coil 26 of the normal trip device 24. The trip coil responds by driving the armature 27 to the left to effect release of the latching lever 19 to allow the circuit breaker 10 to open under the bias of its opening spring 17. The trip circuit 76 extends from a positive bus 75 to the negative bus 73 through the trip coil 26, an "a" switch 69, and the controlled rectifier 68.

The power for the tripping operation is derived from a potential transformer 80 having a primary winding 81 connected between the power line 12 and ground and a secondary winding 82 having one of its terminals connected to the negative control bus 73 and its other terminal connected to the positive control bus 75 through a rectifier 83. The output from the secondary winding 82 is rectified by the rectifier 83 connected in series with the secondary winding and this output is smoothed by a smoothing capacitor 84 connected in series with the rectifier 83 across the secondary winding 82. It will therefore be apparent that the power for tripping the circuit breaker is derived from power line voltage.

Connected across the smoothing capacitor 84 is a high resistance monitoring circuit 85 comprising the series combination of a Zener diode 86 and the coil 87 of a monitoring relay 88. The voltage normally present across the capacitor 84 is considerably higher than the breakdown voltage of the Zener diode 86, and, as a result, enough current flows through the monitoring circuit 85 under normal conditions to maintain the monitoring relay 88 in its picked-up condition shown in the drawing. As an example of the voltages typically present in one embodiment of our invention, the voltage normally present across the terminals 75 and 73 is in the range of 134 to 184 volts. The Zener diode has a breakdown voltage of about 82 volts. Thus, the Zener diode is normally in a conducting state with 82 volts maintained across its terminals. This permits enough current to flow through the monitoring circuit 85 to maintain the monitoring relay picked up under ordinary conditions.

It is desirable to limit this current through the monitoring circuit 85 to as low a value as possible so that the capacitor 84 will not lose an excessive portion of its charge during short intervals of reduced voltage on the main power line. Thus, the relay 88 selected from the monitoring relay is a relay having a coil 87 with a very high resistance that limits the current through monitoring circuit 85 to an acceptably low value and is also a highly sensitive relay capable of picking up and remaining picked up for these very low currents. The high resistance of this monitoring circuit enables me to hold the capacitor 84 charged to a voltage level high enough to produce operation of the normal trip device 24 at the end of the longest time delay opening period obtainable with the disclosed tripping circuit. Thus, even for these longest time delays, the normal tripping device is ordinarily available to produce tripping of the circuit breaker in the event of an overcurrent.

If the normal trip device is to be relied upon for tripping the circuit breaker, a predetermined amount of voltage should be present across the terminals, 75, 73. Otherwise, there is a chance that insufficient current to effect tripping will flow through the trip coil 26 when the controlled rectifier 68 is fired in response to an overcurrent.

To assure that there will always be enough energy available to trip the circuit breaker when an overcurrent occurs, we rely upon the stand-by trip device 25 for tripping the breaker when the voltage across the terminals 75, 73 is below a predetermined level. The solenoid 31 of this stand-by trip device is electrically located in a circuit 90 that is connected across the signal voltage source, but there is a set of normally-open contacts 91 in this circuit that renders the stand-by trip device 25 insensitive to overcurrent conditions, and thus the stand-by trip device normally remains inactive when an overcurrent occurs. The contacts 91 are the normally-open contacts of the stand-by relay 88, and thus their operation is dependent upon the voltage present across the terminals 75, 73. If the control voltage across the terminals 75, 73 should fall below a predetermined level, the contacts 91 are caused to close by drop-out of the monitoring relay 88, and this results in the signal voltage from the current sensing means 34, 36, 38, 39 being applied directly to the terminals of the solenoid 31. Should this signal voltage rise above a predetermined value, then the solenoid 31 will operate to cause the stand-by trip device to trip the circuit breaker. In a preferred form of our invention, this predetermined voltage at which the stand-by trip device operates is slightly higher than the current value at which the gating relay 55 operates, for example, at a signal voltage corresponding to three times normal line current as compared to two times normal line current for the gating relay. This higher pick-up value for the stand-by trip device assures that the standby trip device will not unnecessarily trip the circuit breaker during periods of minor overcurrent, when it is likely that control voltage will be regained sufficiently to reinsert the normal trip device 24.

The voltage level at which the monitoring relay 88 drops out is a level slightly higher than the minimum voltage level at which sufficient energy is available to operate the normal trip device 24. A small margin is made available between these two levels to provide a factor of safety that insures that the stand-by trip device is always available for tripping when insufficient energy is available to operate the normal trip device in its intended manner.

As was pointed out hereinabove, the monitoring relay is a sensitive high resistance relay. Such relays are typically characterized by drop-out voltages that may vary unpredictably over a wide range from about 30% of their pickup voltage down even as low as zero volts. It is important, however, that despite this wide range of drop-out voltages, our monitoring relay 88 drop out at a precise voltage slightly higher than the minimum safe operating level for the normal trip device 24. Otherwise, there would be a danger that the normal trip device would remain connected in circuit when it was not able to trip the breaker, and the stand-by trip device would remain out of the circuit when it was needed. This precise drop-out performance is obtained by relying upon the characteristics of Zener diode 86. This Zener diode will become virtually nonconductive to reverse current when the voltage across its terminals falls to a predetermined fixed value, which in the illustrated embodiment is 82 volts. Assume now that the relay 88 is rated to pick-up at 30 volts across its terminals and is rated to drop out at between 9 volts and zero volts across its terminals. So long as the voltage between terminals 75 and 73 of the control power circuit is about 9 volts above 82 volts, the Zener diode recovery voltage, sufficient current can flow through the monitoring circuit 85 to maintain the relay 88 picked up. But should the voltage across the terminals 75, 73 fall to 82 volts or less, the Zener diode would become nonconducting and current flowing through the monitoring circuit 85 would be quickly reduced to virtually zero. If the monitoring relay had not already dropped out at between 82 and 91 volts across terminals 75, 73, drop out would be assured at 82 volts in view of the reduction in current to virtually zero which accompanies restoration of the Zener diode to its non-conducting state. The minimum safe operating voltage for the normal trip device 24 is about 70 volts. Thus, we assure that the stand-by trip device will be available for operation at a voltage above this minimum safe operating level.

It is important to prevent the controlled rectifier 68 from firing when there is insufficient voltage available to cause the normal trip device 24 to open the circuit breaker. Otherwise, there could possibly occur a condition in which current would flow continuously through the tripping circuit 76 without interruption until some of the components would be damaged. Such a condition is precluded if the circuit breaker trips open because such tripping opens the "a" switch 69 in the tripping circuit, giving the controlled rectifier an opportunity for recovery to its normal condition. To prevent the controlled rectifier 68 from being fired unless tripping of the circuit breaker is assured, we provide the monitoring relay 88 with another set of contacts 92 that close upon dropout of the monitoring relay to establish a short circuit between the emitter and the lower base of the unijunction transistor 60. This short circuit prevents a voltage from being built up on the emitter 64 of sufficient magnitude to fire the unijunction transistor and, hence, the controlled rectifier 68. Thus, no firing of the controlled rectifier 68 is permitted unless an immediately-following opening of the circuit breaker is assured.

It is to be noted that our stand-by tripping arrangement does not produce tripping if no overcurrent is present during the reduced voltage. It is only when an overcurrent occurs that tripping is produced. Should the control voltage be restored to a normal range before the circuit breaker is tripped, then the monitoring relay 88 will again pick up to effectively reconnect the normal trip device 24 in the tripping circuit and to disconnect the standby trip device 25.

If the circuit breaker is open and the control voltage is either unavailable or at an excessively low level, it is ordinarily desirable that the circuit breaker not be closed. We can prevent such closing by providing the standby relay 88 with another set of contacts 100 connected in series with the closing coil 101 of the circuit breaker. If the control voltage is insufficiently high to hold monitoring relay 88 picked up, these contacts will be open and energization of the series-connected closing coil 88 will be prevented. The details of the circuit for controlling the closing coil have not been shown, it being understood that these can be conventional. There is shown, however, a set of contacts 102 in series with the coil 101 and adapted to be closed either manually or automatically to initiate closing. A suitable lockout device 104 of conventional design connected in series with these circuit parts is also provided to cause the circuit breaker to remain open after a predetermined number of opening and closing operations occurring in quick succession.

A situation which the disclosed tripping arrangement is especially suited to handle is one in which a backup breaker (not shown) is opened to deenergize the power line 12 and is later closed while a fault is present on the line downstream from the circuit breaker 10. Opening of the back-up breaker would have reduced the voltage on power line 12 to zero, thus inserting the stand-by trip device 25. When the back-up breaker is closed with the fault on the line 12 downstream from breaker 10, the stand-by trip device 25 would cause the breaker 10 to open, thus permitting the back-up breaker to remain closed, as would normally be desired.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. An overcurrent-sensitive tripping arrangement for an electric circuit breaker comprising:
   (a) a normal trip device operable to cause opening of said circuit breaker,
   (b) a stand-by trip device operable to cause opening of said circuit breaker,
   (c) the stand-by trip device being capable of operating in response to a substantially lower energy input than the normal trip device,
   (d) a trip circuit for supplying operating energy to said normal trip device in response to overcurrents exceeding a predetermined value, said trip circuit comprising a control power circuit having terminals across which a control voltage having a predetermined minimum value must be present to cause said trip circuit to effect operation of said normal trip device in response to said overcurrents,
   (e) and monitoring means sensitive to the voltage across said terminals for normally maintaining said stand-by trip device insensitive to said overcurrent, said monitoring means being responsive to a drop in said control voltage to a predetermined level to render said stand-by tripping device responsive to said overcurrents,
   (f) said stand-by trip device including means effective when said stand-by trip device has been rendered responsive to overcurrents for precluding said stand-by trip device from operating to open said circuit breaker until an overcurrent is present, whereby said circuit breaker can remain closed if no overcurrent is present when said control voltage drops to said predetermined level.

2. A tripping arrangement for an electric circuit breaker comprising:
   (a) a normal trip device operable to cause opening of said circuit breaker,
   (b) a stand-by trip device operable to cause opening of said circuit breaker,
   (c) the stand-by trip device being capable of operating in response to a substantially lower energy input than the normal trip device,
   (d) a trip circuit for supplying operating energy to said normal trip device in response to overcurrents exceeding a predetermined value, said trip circuit comprising a control power circuit having terminals across which a control voltage having a predetermined minimum value must be present to cause said trip circuit to effect operation of said normal trip device in response to said overcurrents,
   (e) and monitoring means sensitive to the voltage across said terminals for normally maintaining said stand-by trip device insensitive to said overcurrent, said monitoring means being responsive to a drop in said control voltage to a predetermined level to render said stand-by tripping device responsive to said overcurrents,
   (f) said monitoring means also rendering said normal tripping device insensitive to said overcurrents in response to a drop in said control voltage to said predetermined level.

3. In an overcurrent-sensitive tripping arrangement for an electric circuit breaker:
   (a) a normal trip device operable to causing opening of said circuit breaker,
   (b) a stand-by trip device operable to cause opening of said circuit breaker,
   (c) the stand-by trip device being capable of operating in response to a substantially lower energy input than the normal trip device,
   (d) current sensing means for deriving from a power line unidirectional signal voltage having a magnitude varying as a direct function of the magnitude of current in said power line.
   (e) a normally inactive timing circuit to which said signal voltage is applied, said timing circuit being arranged to develop an output voltage that builds up at a rate dependent upon the magnitude of the voltage applied thereto when the timing circuit is rendered active,
   (f) gating means having a normal condition for rendering said timing circuit inactive and operable into a second condition in response to an increase in signal voltage to a predetermined level to render said timing circuit active,
   (g) a source of tripping energy,
   (h) means for supplying energy from said source to said normal tripping device in response to a buildup in the output voltage from said timing circuit to a predetermined level,
   (i) monitoring means sensitive to the voltage across said source of tripping energy for normally maintaining said standby trip device insensitive to said overcurrents,
   (j) said monitoring means being responsive to a drop in said control voltage to a predetermined level to render said stand-by trip device responsive to said overcurrents,
   (k) said stand-by trip device including means effective when said stand-by trip device has been rendered responsive to overcurrents for precluding said standby trip device from operating to open said circuit breaker until an overcurrent is present, whereby said circuit breaker can remain closed if no overcurrent is present when said control voltage drops to said predetermined level.

4. In a tripping arrangement for an electric circuit breaker:
(a) a normal trip device operable to cause opening of said circuit breaker,
(b) a stand-by trip device operable to cause opening of said circuit breaker,
(c) the stand-by trip device being capable of operating in response to a substantially lower energy input than the normal trip device,
(d) current sensing means for deriving from a power line unidirectional signal voltage having a magnitude varying as a direct function of the magnitude of current in said power line,
(e) a normally inactive timing circuit to which said signal voltage is applied, said timing circuit being arranged to develop an output voltage that builds up at a rate dependent upon the magnitude of the signal voltage applied thereto when the timing circuit is rendered active,
(f) gating means having a normal condition for rendering said timing circuit inactive and operable into a second condition in response to an increase in signal voltage to a predetermined level to render said timing circuit active,
(g) a source of tripping energy,
(h) means for supplying energy from said source to said normal tripping device in response to a buildup in the output voltage from said timing circuit to a predetermined level,
(i) monitoring means sensitive to the voltage across said source of tripping energy for normally maintaining said standby trip device insensitive to said overcurrents,
(j) said monitoring means being responsive to a drop in said control voltage to a predetermined level to render said stand-by trip device responsive to said overcurrents,
(k) said monitoring means also rendering said normal trip device insensitive to overcurrents in response to a drop in said control voltage to said predetermined level.

5. In an arrangement for producing circuit breaker tripping in response to overcurrents in a power line,
(a) current sensing and timing means for producing an output signal of a predetermined value after a time delay that varies in duration inversely with respect to the magnitude of said overcurrents;
(b) normal trip means for producing tripping of said circuit breaker in response to an increase in said output signal to said predetermined value,
(c) said normal trip means comprising a capacitor for storing tripping energy, means for charging said capacitor from power line voltage, and means for discharging said capacitor to effect tripping when said output signal reaches said predetermined value,
(d) said normal trip means having the ability to produce tripping of said circuit breaker only if the voltage across said capacitor exceeds a predetermined minimum value when said output signal reaches said predetermined level,
(e) a monitoring circuit connected across said capacitor and having a sufficiently high impedance normally to prevent the voltage across said capacitor from falling below said minimum value during the longest time delay periods for tripping of said circuit breaker,
(f) standby trip means for producing tripping of said circuit breaker in response to overcurrents when active,
(g) a monitoring relay having an operating coil connected in said monitoring circuit and effective upon dropout to render said standby trip means active,
(h) a Zener diode connected in series with said operating coil in said monitoring circuit,
(i) the Zener diode being poled to block current flow through said coil when the voltage across said capacitor is below the breakdown voltage of the Zener diode,
(j) the breakdown voltage of said Zener diode exceeding said minimum value of voltage that will produce operation of said normal trip means.

6. In a tripping arrangement for an electric circuit breaker:
(a) a normal trip device operable to cause opening of said circuit breaker,
(b) a stand-by trip device operable to cause opening of said circuit breaker,
(c) the stand-by trip device being capable of operating in response to a substantially lower energy input than the normal trip device,
(d) current sensing means for deriving from a power line unidirectional signal voltage having a magnitude varying as a direct function of the magnitude of current in said power line,
(e) a normally inactive timing circuit to which said signal voltage is applied, said timing circuit being arranged to develop an output voltage that builds up at a rate dependent upon the magnitude of the signal voltage applied thereto when the timing circuit is rendered active,
(f) gating means having a normal condition for rendering said timing circuit inactive and operable into a second condition in response to an increase in signal voltage to a predetermined level to render said timing circuit active,
(g) a source of tripping energy,
(h) means for supplying energy from said source to said normal tripping device in response to a buildup in the output voltage from said timing circuit to a predetermined level,
(i) monitoring means sensitive to the voltage across said source of tripping energy for normally maintaining said standby trip device insensitive to said overcurrents,
(j) said monitoring means being responsive to a drop in said control voltage to a predetermined level to render said stand-by trip device responsive to said overcurrents,
(k) said monitoring means rendering the stand-by trip device responsive to said overcurrents by connecting said stand-by trip device across said current sensing means, so that said stand-by trip device can be directly energized by said signal voltage.

7. A tripping arrangement for an electric circuit breaker comprising:
(a) a normal trip device operable to cause opening of said circuit breaker,
(b) a stand-by trip device operable to cause opening of said circuit breaker,
(c) the stand-by trip device being capable of operating in response to a substantially lower energy input than the normal trip device,
(d) a trip circuit for supplying operating energy to said normal trip device in response to overcurrents exceeding a predetermined value, said trip circuit comprising a control power circuit having terminals across which a control voltage having a predetermined minimum value must be present to cause said trip circuit to effect operation of said normal trip device in response to said overcurrents,
(e) and monitoring means sensitive to the voltage across said terminals for normally maintaining said stand-by trip device insensitive to said overcurrent, said monitoring means being responsive to a drop in said control voltage to a predetermined level to render said stand-by tripping device responsive to said overcurrents, (f) said control voltage across said terminals being unidirectional, (g) said monitoring means comprising a monitoring relay having an operating coil connected between said terminals and effective upon drop-out to render said stand-by trip device responsive to overcurrents, and a Zener diode connected in series with said operating coil across said terminals, the Zener diode being poled to block current flow through said coil when the voltage across said terminals is below the breakdown voltage of the Zener diode, the breakdown voltage of said Zener diode exceeding said minimum value of voltage that will produce operation of said normal trip device.

References Cited by the Examiner

UNITED STATES PATENTS

| | | | |
|---|---|---|---|
| 2,210,669 | 8/40 | Johnson | 317—60 X |
| 2,280,898 | 4/42 | Dyer | 317—60 |
| 2,397,203 | 3/46 | Raymond | 317—60 |

SAMUEL BERNSTEIN, *Primary Examiner.*